(12) United States Patent
Sachdev

(10) Patent No.: US 11,165,900 B2
(45) Date of Patent: Nov. 2, 2021

(54) AUTOMATED REAL-TIME CALL SUMMARIZATION

(71) Applicant: UNIPHORE TECHNOLOGIES INC., Palo Alto, CA (US)

(72) Inventor: Umesh Sachdev, Fremont, CA (US)

(73) Assignee: UNIPHORE TECHNOLOGIES INC., Palo Alto, CA (US)

( * ) Notice: Subject to any disclaimer, the term of this patent is extended or adjusted under 35 U.S.C. 154(b) by 0 days.

(21) Appl. No.: 16/663,339

(22) Filed: Oct. 25, 2019

(65) Prior Publication Data

US 2021/0126999 A1 Apr. 29, 2021

(51) Int. Cl.
*H04M 1/64* (2006.01)
*H04M 1/656* (2006.01)
*H04M 1/72436* (2021.01)

(52) U.S. Cl.
CPC ....... *H04M 1/656* (2013.01); *H04M 1/72436* (2021.01)

(58) Field of Classification Search
CPC .................. H04M 1/656; H04M 1/72552
See application file for complete search history.

(56) References Cited

U.S. PATENT DOCUMENTS

| | | | |
|---|---|---|---|
| 8,798,242 B1* | 8/2014 | Sankaranarayanan | H04M 3/42221 379/265.03 |
| 2001/0025309 A1* | 9/2001 | Macleod Beck et al. | G06F 40/279 709/223 |
| 2005/0177368 A1* | 8/2005 | Odinak | H04M 3/51 704/246 |
| 2014/0156383 A1* | 6/2014 | Vijayaraghavan | G06Q 30/0244 705/14.43 |
| 2015/0195406 A1* | 7/2015 | Dwyer | G10L 15/26 379/265.07 |
| 2015/0381807 A1* | 12/2015 | Konig | G06Q 10/063112 379/265.06 |
| 2018/0091654 A1* | 3/2018 | Miller | G06Q 50/2057 |
| 2019/0037077 A1* | 1/2019 | Konig | H04M 3/5183 |
| 2020/0065825 A1* | 2/2020 | Douglas | H04M 3/5183 |
| 2021/0124843 A1* | 4/2021 | Vass | G06F 21/6254 |

* cited by examiner

*Primary Examiner* — Simon King
(74) *Attorney, Agent, or Firm* — Praveer K Gupta

(57) ABSTRACT

Method for real-time automated call summarization comprises determining an issue of a caller based on at least one of a call transcript, an extracted intent from the call transcript, or a slot of the intent. Based on the issue, a resolution is determined, and further an action item to implement the resolution is determined. The determined resolution and the action item are displayed in a graphical user interface (GUI).

14 Claims, 4 Drawing Sheets

AUTOMATED REAL-TIME CALL SUMMARIZATION

FIELD OF INVENTION

The present invention relates generally to improving call center computing and management systems, and particularly to automated real-time call summarization.

BACKGROUND OF INVENTION

Several businesses need to provide support to its customers, which is provided by a customer care call center. Customers place a call to the call center and customer service agents in the call center address and resolve customer issues. Computerized call management systems are customarily used to assist in logging the calls, and implementing resolution of customer issues. An agent (user of a computerized call management system) is required to capture the issues accurately, plan a resolution to the satisfaction of the customer, and capture a summary of the call for future record, compliance and for implementing the resolution. Despite several advances, the burden on the agents in capturing information from the call is high, and limits the ability of an agent in the number of calls handled by the agent.

Therefore, there exists a need for improving the state of the art in call management.

SUMMARY OF THE INVENTION

The present invention provides a method and an apparatus for automated real-time call summarization, substantially as shown in and/or described in connection with at least one of the figures, as set forth more completely in the claims.

These and other features and advantages of the present disclosure may be appreciated from a review of the following detailed description of the present disclosure, along with the accompanying figures in which like reference numerals refer to like parts throughout.

BRIEF DESCRIPTION OF DRAWINGS

So that the manner in which the above-recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
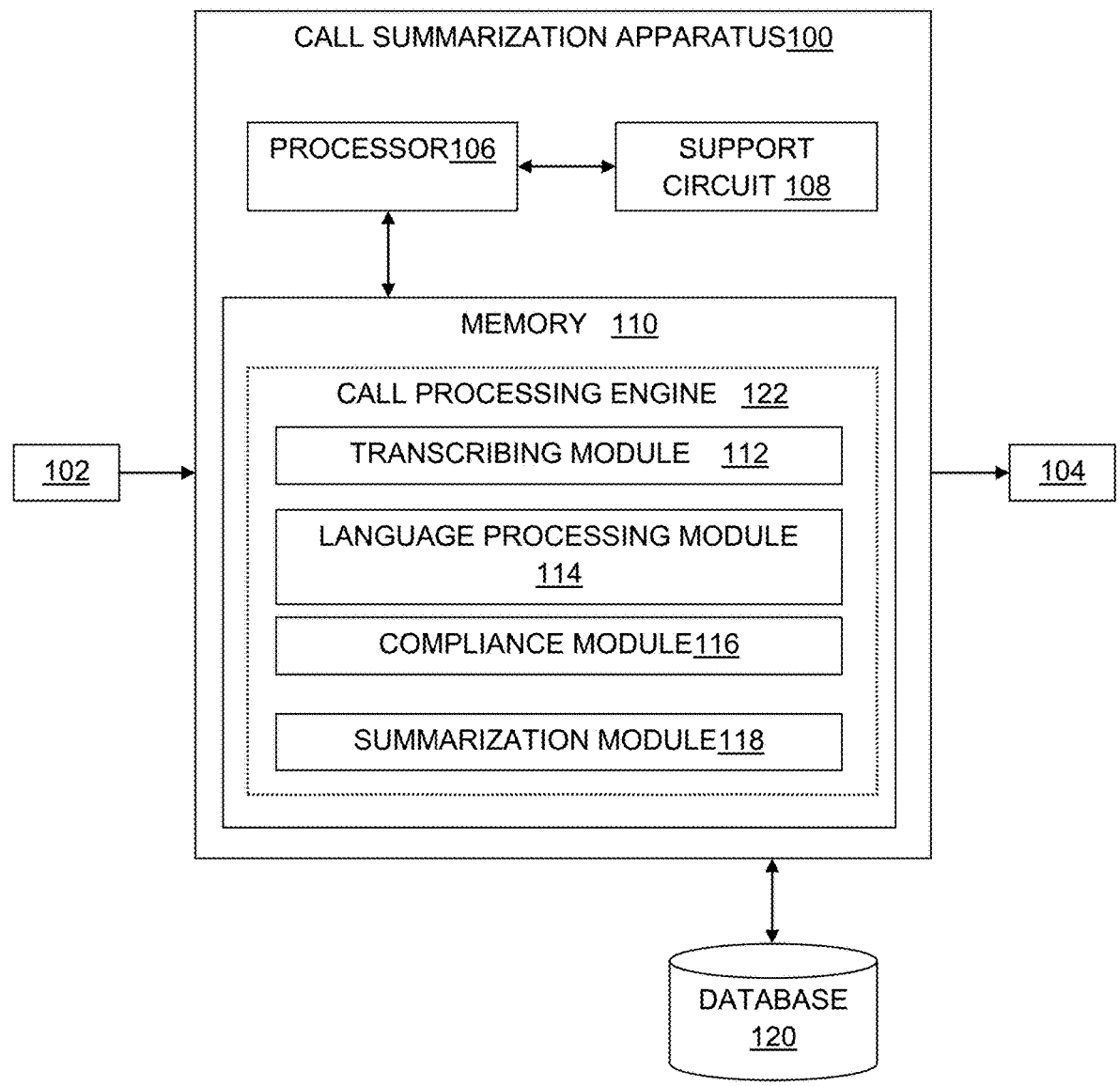
FIG. 1 is a schematic diagram of a call summarization apparatus, in accordance with an embodiment of the present invention.

Embodiments of the present invention relate to a method and an apparatus for automated real-time call summarization. A call summarization apparatus comprises a call processing engine, which is implemented on one or more computers. The engine is configured to transcribe audio data from a call when the call is still active, and generate text data of the call in real time, that is, as the parties on the call (i.e., a customer and an agent) speak. The audio of such speech is converted to text using automatic speech recognition (ASR) techniques. The engine applies language processing techniques to the text data to comprehend the text data, for example, to extract markers relevant to the call, in real time. Markers may include an intent of the customer, a slot or a further sub-category of the intent of the customer. The engine compares the call, in real time, using the text data with one or more rules stored in a knowledge database, for example, compliance rules, performance rules, resolution rules and the like. The engine generates alerts if any instances of issues with compliance or performance are found, and presents such alerts to the agent and/or a supervisor of the agent during the call, and/or after the call is concluded.

The engine further identifies an issue (e.g., a complaint, a request, among others), which is the purpose of the customer's call. Using Natural Language Processing (NLP) techniques with built-in Natural Language Understanding & Generation (NLU,NLG) techniques, powered by deep, bi-directional Recursive Neural Networks (RNN) algorithm, the engine identifies the intents in the call, extracts various slots under each intent to further identify the sentiments, resolutions, actions and promises from the call. Intents are conversation shapers, and the issue is one of the intents. Slots are in general places, cities, timelines, among other related factors. Based on the intents, including the identified issue, and one or more of text data, orresolution rulesaugmented with data from back-end knowledge systems, customer relationship management (CRM) databases, the engine identifies a resolutionto address or fulfil the identified issue. The engine further identifies specific action items in accordance with the determined resolution, for example, based on one or more of the text data or the resolution rules. The engine may additionally identify personnel or departments responsible for the action items. The engine presents a summarization of the call, which includes the identified issue, the identified resolution and action items, in a graphical user interface (GUI) to the agent, after the call is concluded. Optionally, the engine also presents one or more of the entire text data, portions thereof, intent, slot, compliance, or performance issues.

As used herein, the term "real time" means as soon as possible, unless indicated otherwise. For example, the audio data from the call is transcribed to text data, as soon as possible, including while the call is under progress. Similarly, language processing techniques are used to process the text as soon as possible, depending on as and when processable text becomes available, and the compliance is checked as soon as processed text becomes available. Similarly, elements for constituting the summary are prepared as soon as processable information from transcription, language processing and/orcompliance check becomes available and can be summarized. Such elements are aggregated over the duration of the call, and upon conclusion of the call, and portions of the call that were not previously processed for summarization are processed, supplemented with the aggregated elements, and presented as a summary. In some instances, a call summary is prepared only after the call is concluded, and is presented as soon as possible after the conclusion of the call, based on the processing time for call summarization.

FIG. 1 discloses a call summarization apparatus 100 in accordance with an embodiment of the present invention. The apparatus 100 receives data from a real-time audio stream of a call 102 and generates and/or presents a summary 104 of the call 102 in real-time. The apparatus 100 includes a processor 106 communicatively coupled to support circuits 108 and a memory 110. The processor 106 may be any commercially available processor, microprocessor, microcontroller, and the like. The support circuits 108 comprise well-known circuits that provide functionality to the CPU, such as, a user interface, clock circuits, network communications, cache, power supplies, I/O circuits, and the like. The memory 110 is any form of digital storage used for storing data and executable software. Such memory includes, but is not limited to, random access memory, read only memory, disk storage, optical storage, and the like.

The memory 106 includescomputer readable instructions corresponding to an operating system (not shown) and a call processing engine 122. The call processing engine 122 is configured to transcribe audio data from an active call, and generate text data of the call in real time. In an embodiment, the call processing engine 122 includes a transcribing module 112, a language processing module (LPM) 114, a compliance module 116 and a summarization module 118. The modules 112-118 include computer executable instructions, which when executed by the processor 106, perform the task or function specific to each module.

The transcribing module 112 receives audio data of the call 102 in real-time. The transcribing module 112 transcribes the audio datato generate text datacorresponding to the conversation between the caller or customer and the agent who receives the call, in real-time. The transcription is performed using automatic speech recognition (ASR) techniques as generally known in the artand, for example, NUANCE® RECOGNIZERS/TRANSCRIBERS (NR/NTE), IBM® WATSON®, or GOOGLE® ASR engines.

The LPM 114 processes the text data using one or more language processing techniques, for example, natural language processing (NLP) as generally known in the art. The LPM 114 extracts one or more intentions (or "intents") of the caller from the text data. The LPM 114 may additionally extract a slot or an additional category under each intent. The LPM 114 may also extract a sentiment of the customer from the text data. The sentiment of the customer may be categorized as one of 'negative', 'positive', or 'neutral', among other appropriate categorizations.

The compliance module 116 identifies occurrences of non-compliance, or other performance attributes of agent in the call, which include, but are not limited to, Average Call Handling Time (ACHT), Average Hold Time, and First Call Resolution (FCR), among others. In one embodiment, the compliance module 116 alerts an agent or a supervisor of the agent to the identified non-compliance, or call performance attributes. The compliance module 116 additionally analyzes the text data and compares it with rules stored in a backend knowledge database in real-time. Based on the comparison, the compliance module 116 sends relevant data for display to an agent or the agent's supervisor.

The summarization module 118 identifies an issue of a caller based on at least one of a call transcript, an extracted intent from the call transcript, a slot of the intent, and/or a sentiment of the customer. The summarization module 118 further identifies a resolution based on the identified issue, and further identifies one or more action items to implement the determined resolution. Additionally, the summarization module 118 may determine one or more personnel or departments responsible for the execution of the one or more action items. The summarization module 118 summarizes the call to include the identified issue, the resolution and the action items, and further sends the call summary for display in a graphical user interface (GUI) on a console visible to the agent. In one embodiment, the summarization module 118 additionally includesa part of or the entire data generated by the transcribing module 112, the language LPM 114, or the compliance module 116.

The summary is automatically generated by the summarization module 118, and presented to the agent. The agent may then edit the automatically generated call summary, and complete the call summarization. The automatic call summary reduces a significant workload burden on the agent and also reduces the possibility of human error in call summarization. Given that the entire resolution (and actions therefor) are captured in a call summary, call summarization is pivotally important to the success of the agent's work. For example, conventionally, average after call workload (ACW), in which the agent summarizes the call ranges from 60 to 90 seconds. The automatic call summarization as described above reduces the average ACW by about 46 seconds to 56 seconds, or a reduction of about 25% to 40%, which is a significant reduction in the workload burden of the agent in a critical phase of call handling, and increases the ability of the agent in handling more calls with accuracy. Further, the automatic call summarization also reduces the possibility of human error by accurately capturing the issue, the resolution and optionally action items, thereby increasing the success rate or first call resolution (FCR), which increases customer satisfaction. Additionally, the automatic call summarization also reduces average call handling time (ACHT).

In one embodiment, the summarization module 118 additionally presents profile data of the customer and historical data related to the customer in a profile section of the GUI. The profile data of the customer and historical data related to the customer may be retrieved from a profile database, for example, included in the database 120. The text data generated by the transcribing module 112 may be presented by the summarization module 118 in a transcriptionsection of the GUI as the text data is generated. Alerts and /or tips generated by the compliance module 116 may be presented by the summarization module 118 in an alerts section of the GUI.

During the call, a blank summary field may be presented to the agent by the summarization module 118 in a summary section of the GUI. The call summarization module 118 populates the summary section with the automatically generated call summary 104 upon conclusion of the call.

In one embodiment, the call summary 104 is editable. The agent may edit the call summary 104 from within the call summary section of the GUI. A final version of the call summary 104 may is stored in the database 120 for future reference. In one embodiment, the final version of the call summary 104 is sent to supervisor of the agent.

Various rules, for example, compliance rules, performance rules, resolution rules, and the like are used to detect compliance or performance events or identify/determine resolutions by comparison with call data, including text data, intent, slots, emotion, among other attributes of the call. The comparison utilizes pattern match, Boolean operators, call offset selection, channel selectionand call data. For example, pattern matchrefers to event rules based on speech containing defined keywords, and a combination of several keywords patternsare identified using Boolean operators. The call offset selection componentdefines event rules that are based on the span of a call. For example, event rules can be defined during an opening span of a call, or a closing span of a call or any other time as desired. Channel selection refers to mapping the keywords to an agent channel or a customer channel. An agent channel typically focuses on the agent's interaction with a customer.

By monitoring a manner in which an agent interacts with a customer, the agent performance can be assessed. Call data further comprises information regarding various attributes of the call, for example, call duration, speech overlap, silence, talkover, among others. Based on above techniques, various defined rules are used to identify an event, such as a compliance event, or a performance event, and resolution, such as a resolution to address the issue of the customer.

Figure 2:
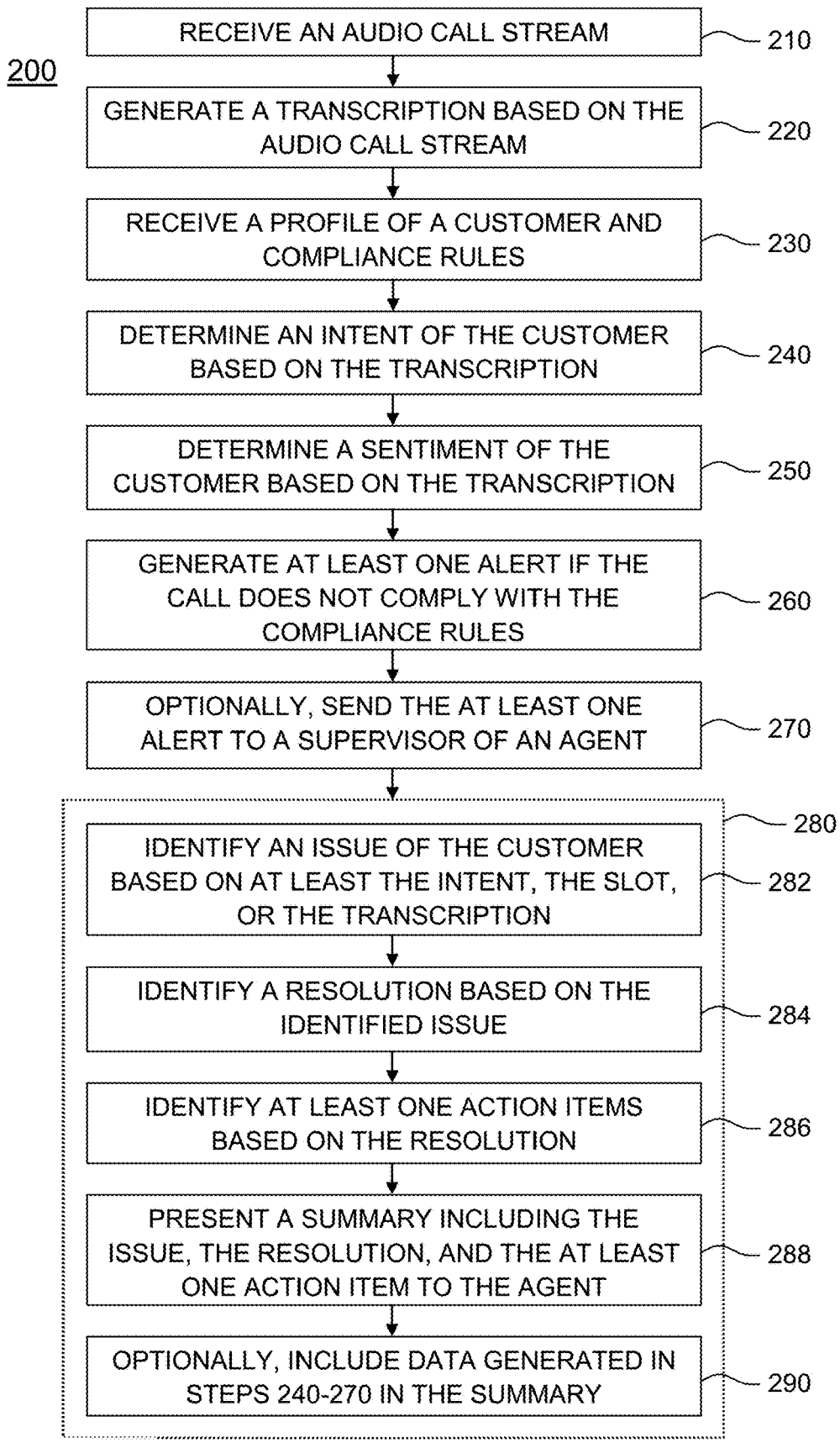
FIG. 2 is a flow diagram of call summarization method, in accordance with an embodiment of the present invention.

FIG. 2 is a flow diagram of method 200 for call summarization performed by the apparatus 100, in accordance with an embodiment of the present invention. The method 200 starts at step 210, at which the apparatus 100 receives a real-time audio stream (stream of the call while the call is active). For example, the transcribing module 112 of FIG. 1 receives the audio stream.

The method 200 proceeds to step 220, at which the transcribing module 112 generates transcription of the audio stream to generate text data of the call in real time. That is, as the call proceeds, the words being exchanged between the customer and the agent are transcribed. The method 200 proceeds to step 230, at which the compliance module 116 retrieves customer profile data and compliance rules from the database 120. The method 200 proceeds to step 240, at which the LPM 116 determines an intent of the customer, and optionally a slot (a sub-category) under the intent, based on the text data. The method 200 proceeds to step 250, at which the LPM 116 determines a sentiment of the customer based on the text data. The method 200 proceeds to step 260, at which the compliance module 116 compares the compliance rules with the text data, for example, using the techniques described above, and generates at least one alert if any parameter of the call (e.g., customer profile, what the customer or the agent is saying) does not comply with the compliance rules retrieved at step 230. The method 200 proceeds to step 270, at which the compliance module 116 optionally sends the at least one alert to a supervisor of the agent.

The method 200 proceeds to step 280 for call summarization. The step 280 is a composite step representing several steps that comprise call summarization, and comprises steps 282-290. At step 282 of the method 200, the summarization module 118 identifies an issue of the customer based on at least one of a call transcript, an extracted intent from the call transcript, a slot of the intent, and/or a sentiment of the customer. The method 200 proceeds to step 284, at which the summarization module 118 identifies a resolution based on the identified issue. The resolution may be identified using the text data corresponding to the agent's speech. In one embodiment, the resolution is identified using comparison of the identified issue with the resolution rules, for example, using the techniques described above. In one embodiment, the resolution is identified from a combination of the text data corresponding to the agent's speech, and the comparison with resolution rules. The method 200 proceeds to step 286, at which the summarization module 118 identifies one or more action items to implement the resolution, for example, using text data corresponding to the agent's speech, or comparison with resolution rules or a combination thereof. Additionally, the summarization module 118 may determine one or more personnel or departments responsible for the execution of the one or more action items. The method 200 proceeds to step 288, at which the summarization module 118 presents a summary including the issue, the resolution, and the at least one action item in a graphical user interface (GUI) of a console visible to the agent. The method 200 proceeds to optional step 290, at which the summarization module 118 includes data generated in steps 240-270, or portions thereof in the summary 104. For example, such data includes the intent of the customer, a slot of the intent, a sentiment of the customer, or any generated alerts.

Figure 3:
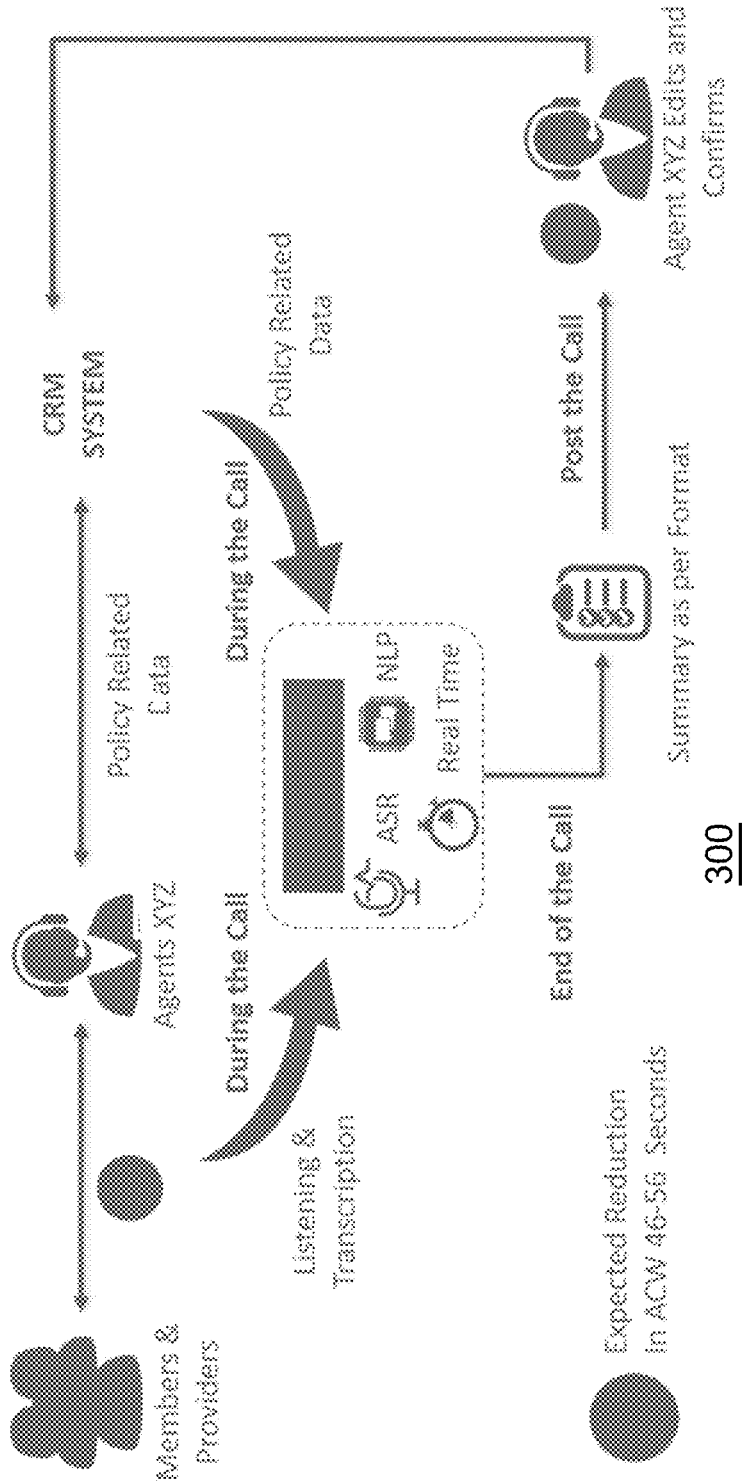
FIG. 3 is a schematic diagram of an environment incorporating the apparatus and the method of FIGS. 1 and 2, respectively, in accordance with an embodiment of the present invention.

FIG. 3 is schematic diagram of an environment 300 in which the apparatus 100 and the method 200 for call summarization of FIGS. 1 and 2 are incorporated, in accordance with an embodiment of the present invention.

Figure 4:
FIG. 4 depicts a graphical user interface (GUI)generated by the call summarization apparatus of FIG. 1 and method of FIG. 2, respectively, in accordance with an embodiment of the present invention.

FIG. 4 is a portion of a GUI 400 presented to an agent by the call summarization apparatus 100 and method 200 of FIGS. 1 and 2, in accordance with an embodiment of the present invention. As can be seen, the call summary is displayed in the "Summary" section, compliance issues or alerts are displayed in the "Alerts" section, and the text data is displayed in the "Transcription" section.

As described above, the embodiments disclosed herein overcome the shortcomings of the state of the art regarding automated real-time call management. The embodiments enable automatic call summarization, yielding significantly lower ACW, and reduced ACHT, which in turn, yield higher efficiency in issue resolution, and higher levels of customer satisfaction. The techniques described herein overcome the issues associated with conventional system, for example, lack of auto alerts to supervisors of the agent regarding customer requested escalations, fatal errors; manual dispositions: Intent, Call Type, Customer Sentiments; missing critical script compliance during call; accessing multiple data during call leading to missed opportunities while doing so; and considerable time consumed in summarizing the calls, that could be prone to errors and increases ACHT. The embodiments described herein may be integrated with call logging systems, customer relationship management systems, or knowledge base systems.

The methods described herein may be implemented in software, hardware, or a combination thereof, in different embodiments. In addition, the order of methods may be changed, and various elements may be added, reordered, combined, omitted or otherwise modified. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible.

Accordingly, plural instances may be provided for components described herein as a single instance. Boundaries between various components, operations, and data stores are somewhat arbitrary, and particular operations are illustrated in the context of specific illustrative configurations. Finally, structures and functionality presented as discrete components in the example configurations may be implemented as a combined structure or component. These and other variations, modifications, additions, and improvements may fall within the scope of embodiments as described.

While the foregoing is directed to embodiments of the present invention, other and further embodiments of the invention may be devised without departing from the basic scope thereof.

I claim:

1. A call summarization apparatus for automated real-time summarization of a call between a customer and an agent while the call is active, the apparatus comprising:
   at least one processor; and
   a memory communicably coupled to the processor, the memory comprising computer-executable instructions, which when executed using the at least one processor, implements a method comprising:
      determining, on the call summarization apparatus, an issue of a customer based on at least one of a call transcript, an intent extracted from the call transcript, or a slot of the intent extracted from the call transcript,
      determining, on the call summarization apparatus, from the call transcript, a resolution provided by an agent to the customer,
      determining, on the call summarization apparatus, from the call transcript, an action item identified by the agent to implement the resolution, and
      displaying a summary comprising the resolution, the action item, and at least one of the issue, the intent, or the slot in a graphical user interface (GUI) on a device accessible to the agent.

2. The apparatus of claim 1, wherein the method further comprises:
   receiving, on a call summarization apparatus, audio data of the call;
   transcribing, on the call summarization apparatus, the audio data to text, immediately upon receipt of the audio data.

3. The apparatus of claim 1, wherein the method further comprises determining, from the call transcript, a sentiment, wherein the sentiment is one of positive, neutral or negative.

4. The apparatus of claim 3, wherein the summary further comprises the sentiment.

5. The apparatus of claim 3, wherein the method further comprises:
   determining, based on the call transcript, non-compliance with compliance rules; and
   generating an alert if non-compliance determined,
   wherein the summary further comprises the non-compliance.

6. The apparatus of claim 1, wherein the summary is editable in the GUI.

7. The apparatus of claim 1, wherein the method further comprises, automatically sending the summary, from the call summarization apparatus, to a supervisor of the agent.

8. A method for real-time automated summarization of a call between a customer and an agent while the call is active, the method comprising:
   determining, on a call summarization apparatus, an issue of a customer based on at least one of a call transcript, an intent extracted from the call transcript, or a slot of the intent extracted from the call transcript;
   determining, on the call summarization apparatus, from the call transcript, a resolution provided by an agent to the customer;
   determining, on the call summarization apparatus, from the call transcript, an action item identified by the agent to implement the resolution; and
   displaying a summary comprising the resolution, the action item, and at least one of the issue, the intent, or the slot in a graphical user interface (GUI) on a device accessible to the agent.

9. The method of claim 8, further comprising:
   receiving, on a call summarization apparatus, audio data of the call;
   transcribing, on the call summarization apparatus, the audio data to text, immediately upon receipt of the audio data.

10. The method of claim 8, further comprising determining, from the call transcript, a sentiment, wherein the sentiment is one of positive, neutral or negative.

11. The method of claim 10, wherein the summary further comprises the sentiment.

12. The method of claim 10, further comprising:
   determining, based on the call transcript, non-compliance with compliance rules; and
   generating an alert if non-compliance determined,
   wherein the summary further comprises the non-compliance.

13. The method of claim 8, wherein the summary is editable in the GUI.

14. The method of claim 8, further comprising, automatically sending the summary, from the call summarization apparatus, to a supervisor of the agent.

* * * * *